United States Patent
Sedlak et al.

(10) Patent No.: US 6,581,842 B2
(45) Date of Patent: Jun. 24, 2003

(54) DATA CARRIER WITH REGULATION OF THE POWER CONSUMPTION

(75) Inventors: Holger Sedlak, Egmating (DE); Robert Reiner, Neubiberg (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/771,914

(22) Filed: Jan. 29, 2001

(65) Prior Publication Data

US 2001/0035461 A1 Nov. 1, 2001

Related U.S. Application Data

(63) Continuation of application No. PCT/EP99/05392, filed on Jul. 27, 1999.

(30) Foreign Application Priority Data

Jul. 29, 1998 (EP) .............................. 98114198

(51) Int. Cl.⁷ .............................................. G06K 19/06
(52) U.S. Cl. ...................................... 235/492; 323/234
(58) Field of Search ................................. 235/492, 380, 235/451; 375/219, 324; 323/234–298

(56) References Cited

U.S. PATENT DOCUMENTS

| | | | | |
|---|---|---|---|---|
| 5,265,161 A | * | 11/1993 | Rodriguez | ................. 235/441 |
| 5,418,353 A | * | 5/1995 | Katayama et al. | ........... 235/380 |
| 5,862,174 A | * | 1/1999 | Yokota et al. | ............... 235/380 |
| 5,998,978 A | * | 12/1999 | Connell et al. | ............... 323/273 |
| 6,126,077 A | * | 10/2000 | Tanaka et al. | ............... 235/492 |
| 6,173,899 B1 | * | 1/2001 | Rozin | ......................... 235/492 |
| 6,176,433 B1 | * | 1/2001 | Uesaka et al. | ............... 235/492 |

FOREIGN PATENT DOCUMENTS

| | | |
|---|---|---|
| EP | 0 296 414 A2 | 12/1988 |
| EP | 0 534 559 A1 | 3/1993 |
| EP | 0701222 A2 | 3/1996 |
| EP | 0813303 A1 | 12/1997 |
| WO | WO 97/08651 | 3/1997 |

* cited by examiner

Primary Examiner—Michael G. Lee
Assistant Examiner—Jamara A. Franklin
(74) Attorney, Agent, or Firm—Laurence A. Greenberg; Werner H. Stemer; Ralph E. Locher

(57) ABSTRACT

A data carrier, in particular a smart card, is described and has at least one transmitting/receiving antenna and also a rectifier circuit connected downstream thereof and serving for providing a supply voltage for at least one circuit unit. A voltage regulating circuit is connected in parallel with the supply voltage terminals of the circuit unit. The voltage regulating circuit has an output at which a signal proportional to a regulating signal of the voltage regulating circuit can be tapped off. This output is connected to the control input of a controllable clock signal generator, which provides the clock signal for the at least one circuit unit.

4 Claims, 1 Drawing Sheet

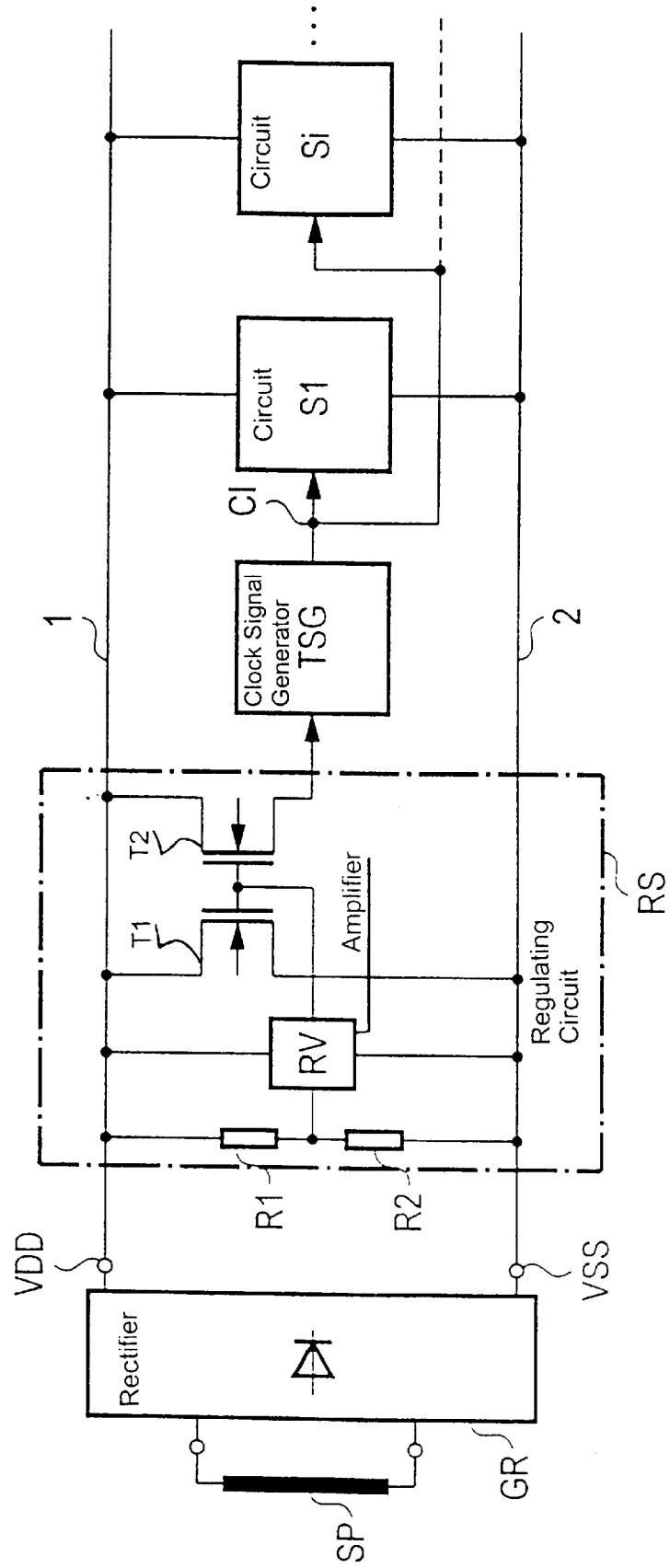

DATA CARRIER WITH REGULATION OF THE POWER CONSUMPTION

CROSS-REFERENCE TO RELATED APPLICATION

This application is a continuation of copending International Application No. PCT/EP99/05392, filed Jul. 27, 1999, which designated the United States.

BACKGROUND OF THE INVENTION

Field of the Invention

The invention relates to a data carrier, in particular a smart card, having at least one transmitting/receiving antenna and also a rectifier circuit connected downstream thereof and serving for providing a supply voltage for at least one circuit unit. A voltage regulator is connected in parallel with the supply voltage terminals of the circuit unit(s).

Such a data carrier is disclosed in International Patent Disclosure WO 97/08651. The known data carrier is a combined smart card whose internal electronic circuits can be operated both via a contact bank and via an integrated coil. In contactless operation via the antenna coil, the energy required to operate the internal circuits is supplied by the electromagnetic field received by the coil. In this case, the available energy fluctuates to a very great extent, since it essentially depends on the distance between the data carrier or the smart card and a read/write station supplying the energy.

This represents a problem since the required energy must be available at any time for desired functioning of the data carrier. Well developed circuits stop functioning before the energy supply deteriorates to such an extent that malfunctions can occur.

The circuits of a contactless data carrier are usually configured in such a way that, at a required maximum range, they manage with the power offered. However, with a shorter distance between the data carrier or the smart card and the read/write station, an excess power is then available which is taken up by the parallel voltage regulator and is thus needlessly lost.

SUMMARY OF THE INVENTION

It is accordingly an object of the invention to provide a data carrier with regulation of the power consumption which overcomes the above-mentioned disadvantages of the prior art devices of this general type, which is matched as optimally as possible to the present supply of power.

With the foregoing and other objects in view there is provided, in accordance with the invention, a data carrier in particular a smart card. The data carrier contains at least one transmitting/receiving antenna, at least one circuit unit having supply voltage terminals, a rectifier circuit connected downstream of the at least one transmitting/receiving antenna and serving for providing a supply voltage for the at least one circuit unit, and a voltage regulating circuit connected in parallel with the supply voltage terminals of the at least one circuit unit and connected to the rectifier circuit. The voltage regulating circuit has an output at which a signal proportional to a regulating signal of the voltage regulating circuit can be tapped off. A controllable clock signal generator is provided and has a control input connected to the output of the voltage regulating circuit. The controllable clock signal generator is connected to the at least one circuit unit and outputs a clock signal received by the at least one circuit unit.

In accordance with an added feature of the invention, the voltage regulating circuit contains a first transistor connected between the supply voltage terminals, and a second transistor connected to one of the supply voltage terminals and has an output terminal. The first transistor forms with the second transistor a current mirror circuit having an output terminal connected to the control input of the controllable clock signal generator. The output terminal of the current mirror is the output terminal of the second transistor.

In the case of the data carrier according to the invention, the object is achieved in that the voltage regulating circuit has an output at which a signal proportional to the regulating signal of the voltage regulating circuit can be tapped off, and in that the output is connected to the control input of a controllable clock signal generator, which provides the clock signal for the at least one circuit unit.

The invention is based on the insight that the power consumption of electrical or electronic circuits depends on the clock frequency and, in particular, increases as the clock frequency increases. In a manner according to the invention, the clock signal generator is configured to be controllable, so that the frequency of the clock signal can be altered by a control signal. The control signal is obtained from the regulating signal of the parallel regulator. In particular, a signal that is proportional to the excess current is used as a measure for the control of the clock signal frequency. This can advantageously be done by a current mirror circuit. In an advantageous embodiment of the invention, the clock signal generator is realized as a voltage-controlled oscillator. Other features which are considered as characteristic for the invention are set forth in the appended claims.

Although the invention is illustrated and described herein as embodied in a data carrier with regulation of the power consumption, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block circuit diagram of parts—essential to the invention—of a data carrier according to the invention, which may be configured, in particular, as a smart card.

DESCRIPTION OF THE PREFERRED EMBODIMENT

Referring now to the single FIGURE of the drawing in detail, there is shown an antenna coil SP whose ends are connected to a rectifier circuit GR in order to receive energy and for exchanging data. At its output terminals, the rectifier circuit GR supplies supply voltages VDD, VSS for circuits S1, Si connected to supply voltage lines 1, 2. In this case, the symbol "i" denotes a number between 2 and n, depending on how many circuits are provided in the data carrier. In order to stabilize the supply voltages VDD, VSS supplied by the rectifier circuit GR, a regulating circuit RS is connected in parallel with the circuits S1, Si.

In the example illustrated, the regulating circuit RS is formed with a voltage divider R1, R2 acting as a voltage detector. A center tap of the voltage divider is connected via a regulating amplifier RV to a gate terminal of a first transistor T1 connected between the supply voltages VDD, VSS. As the supply voltage increases, the first transistor T1 is turned on, so that a larger proportion of current is discharged through the first transistor T1. In this way, the supply voltage VDD is kept at a constant value.

In a development, the regulating circuit RS may also contain a non-illustrated threshold value detector which identifies when the supply voltage VDD falls below a minimum allowed value and outputs a signal which switches off all the circuits S1, Si.

The data carrier according to the invention as illustrated in the figure furthermore has a controllable clock signal generator TSG, so that a frequency of a clock signal C1 provided at its output depends on a level of a control signal present at its control input.

In a manner according to the invention, then, the control signal is proportional to a regulating signal of the regulating circuit RS. In the example illustrated, for this purpose the first transistor T1 is part of a current mirror circuit. A second transistor T2 of the current mirror circuit supplies, at its drain terminal, a signal which is proportional to an excess current flowing through the first transistor T1. This signal is fed to the clock signal generator TSG by a drain terminal of the second transistor T2 being connected to the control input of the clock signal generator TSG.

The invention is not restricted to the exemplary embodiment illustrated. Thus, in order to receive the required energy and/or for data exchange, any suitable antenna can be used instead of the antenna coil SP illustrated. In particular, microwave antennas are also conceivable.

Instead of the simple regulating circuit RS illustrated, it is possible to take any parallel regulating circuit that is familiar to the person skilled in the art and appears to be suitable for the desired purpose.

The circuits S1, Si may be, for example, processors or other logic circuits and any desired types of memories. In particular, all the circuits may be integrated on a single semiconductor chip. However, it is also conceivable to distribute the circuits over a plurality of chips.

We claim:

1. A data carrier, comprising:

at least one transmitting/receiving antenna;

at least one circuit unit having supply voltage terminals;

a rectifier circuit connected downstream of said at least one transmitting/receiving antenna and serving for providing a supply voltage for said at least one circuit unit;

a voltage regulating circuit connected in parallel with said supply voltage terminals of said at least one circuit unit and connected to said rectifier circuit, said voltage regulating circuit having an output for tapping off a signal proportional to a regulating signal of said voltage regulating circuit; and a controllable clock signal generator having a control input connected to said output of said voltage regulating circuit, said controllable clock signal generator connected to said at least one circuit unit and outputs a clock signal received by said at least one circuit unit.

2. The data carrier according to claim 1, wherein said voltage regulating circuit contains a first transistor connected between said supply voltage terminals, and a second transistor connected to one of said supply voltage terminals and has an output terminal, said first transistor forms with said second transistor a current mirror circuit having an output terminal connected to said control input of said controllable clock signal generator, said output terminal of said current mirror is said output terminal of said second transistor.

3. The data carrier according to claim 1, wherein said controllable clock signal generator is a voltage-controlled oscillator.

4. A smart card, comprising:

at least one transmitting/receiving antenna;

at least one circuit unit having supply voltage terminals;

a rectifier circuit connected downstream of said at least one transmitting/receiving antenna and serving for providing a supply voltage for said at least one circuit unit;

a voltage regulating circuit connected in parallel with said supply voltage terminals of said at least one circuit unit and connected to said rectifier circuit, said voltage regulating circuit having an output for tapping off a signal proportional to a regulating signal of said voltage regulating circuit; and a controllable clock signal generator having a control input connected to said output of said voltage regulating circuit, said controllable clock signal generator connected to said at least one circuit unit and outputs a clock signal received by said at least one circuit unit.

* * * * *